(12) United States Patent
Rasanen et al.

(10) Patent No.: US 9,275,323 B2
(45) Date of Patent: Mar. 1, 2016

(54) CORE WITH A TAG

(75) Inventors: Jari Rasanen, Imatra (FI); Niilo Poyhonen, Helsinki (FI)

(73) Assignee: STORA ENSO OYJ, Helsinki (FI)

( * ) Notice: Subject to any disclaimer, the term of this patent is extended or adjusted under 35 U.S.C. 154(b) by 42 days.

(21) Appl. No.: 13/989,255

(22) PCT Filed: Nov. 22, 2011

(86) PCT No.: PCT/FI2011/051023
§ 371 (c)(1),
(2), (4) Date: Jun. 17, 2013

(87) PCT Pub. No.: WO2012/069697
PCT Pub. Date: May 31, 2012

(65) Prior Publication Data
US 2013/0256420 A1    Oct. 3, 2013

(30) Foreign Application Priority Data
Nov. 23, 2010  (FI) .................................. 20106230

(51) Int. Cl.
*G06K 19/06* (2006.01)
*G06K 19/077* (2006.01)
*G06K 15/02* (2006.01)
*G06K 7/08* (2006.01)
*B65H 75/18* (2006.01)

(52) U.S. Cl.
CPC ........ *G06K 19/07758* (2013.01); *B65H 75/182* (2013.01); *G06K 7/08* (2013.01); *G06K 15/024* (2013.01); *B65H 2701/1244* (2013.01); *Y10T 29/49016* (2015.01)

(58) Field of Classification Search
CPC ............................... G06K 15/024; G06K 7/08
See application file for complete search history.

(56) References Cited

U.S. PATENT DOCUMENTS

| | | | |
|---|---|---|---|
| 6,334,587 B1 | 1/2002 | Roder | |
| 2005/0237199 A1 | 10/2005 | Bellum et al. | |
| 2007/0046475 A1* | 3/2007 | Carrender | 340/572.7 |
| 2007/0245913 A1* | 10/2007 | Sugiyama | 101/288 |
| 2009/0079573 A1* | 3/2009 | Jiang et al. | 340/572.7 |
| 2011/0050426 A1* | 3/2011 | Choong | 340/572.1 |

FOREIGN PATENT DOCUMENTS

| | | |
|---|---|---|
| DE | 29903840 U1 | 7/1999 |
| EP | 1266830 A1 | 12/2002 |

(Continued)

OTHER PUBLICATIONS

Finnish Search Report, dated Aug. 31, 2011, from corresponding Finnish application.

(Continued)

*Primary Examiner* — Thien M Le
*Assistant Examiner* — Asifa Habib
(74) *Attorney, Agent, or Firm* — Young & Thompson

(57) ABSTRACT

A paper roll core, which includes a tag and wherein the tag is a tag which is radio-readable and includes a flexible element. The core has its end face provided with a recess with a bottom and a wall, in which the tag is fitted in an at least partially coiled configuration. For example, the tag can be glued in the recess. Alternatively or additionally, the tag can be retained substantially stationary by a springback force evolved as a result of coiling the flexible element, bracing the flexible element against a wall and/or a bottom included in the recess.

14 Claims, 2 Drawing Sheets

(56) References Cited

FOREIGN PATENT DOCUMENTS

| | | | |
|---|---|---|---|
| JP | 2004277103 | A | 10/2004 |
| JP | 2006-232449 | A | 9/2006 |
| JP | 2009249123 | A | 10/2009 |
| WO | 2006042899 | A1 | 4/2006 |

OTHER PUBLICATIONS

International Search Report, dated Feb. 22, 2012, from corresponding PCT application.
Translation of Chinese Office Action, dated Nov. 18, 2014, from corresponding CN application.

* cited by examiner

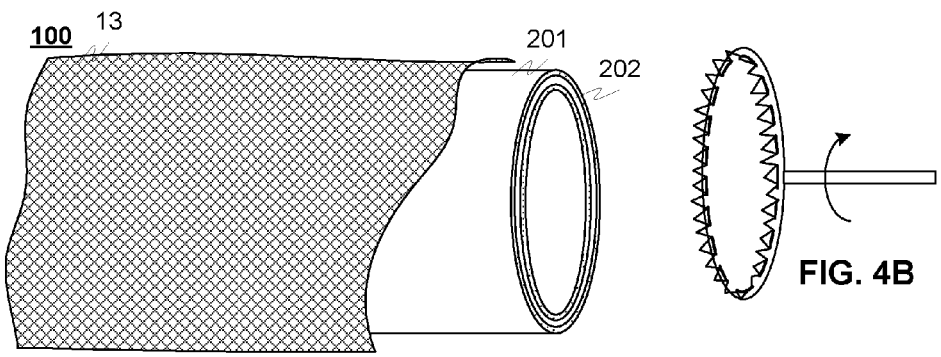
FIG. 4A
FIG. 4B
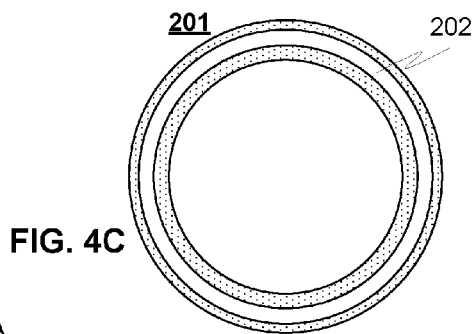
FIG. 4C
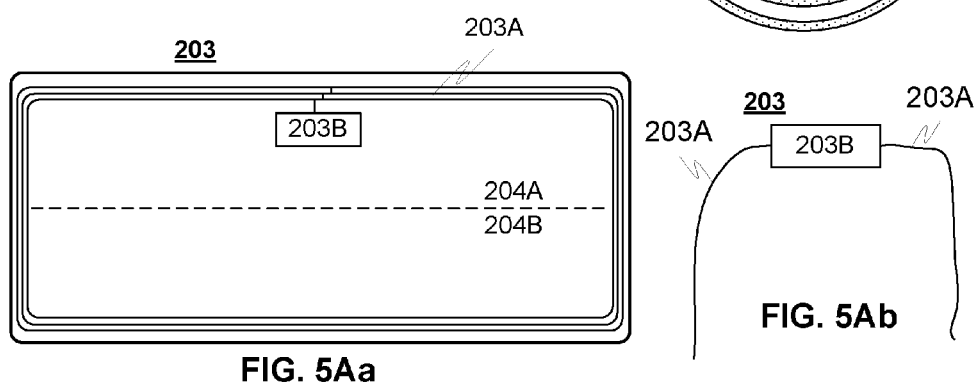
FIG. 5Aa
FIG. 5Ab
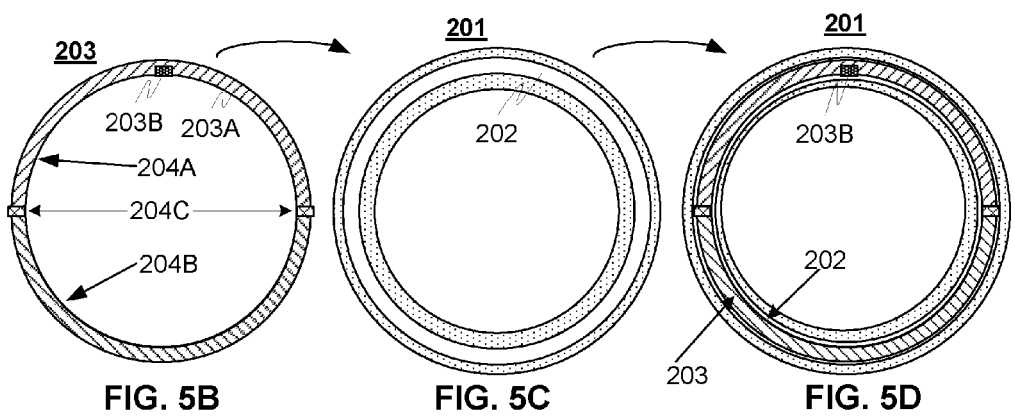
FIG. 5B
FIG. 5C
FIG. 5D

CORE WITH A TAG

The invention relates to a core with a tag, such as to a cardboard core for use as a paper roll carrier.

PRIOR ART

Identification of paper rolls over the entire life cycle thereof, all the way from the manufacturing mill to the end user is important, among others from the standpoint of supply chain and quality control. The prior art discloses solutions, wherein the paper roll is provided for example with a bar code, including an individual identifier. However, a problem with such solutions, among others, is reading the bar code as the reading requires a direct visual contact between the reader and the bar code. In addition, the wearing or detachment of a bar code, for example along with the removal of a paper roll wrapping, causes problems in terms of tracking the paper rolls.

These problems have been addressed by developing paper rolls provided with radio-readable tags, such as RFID tags, wherein the RFID tag is placed on the outer surface of a paper roll core between the core and the paper to be wound around the core. This enables retaining the tag with the roll all the way from mill to end user.

Still, even this solution involves problems, since paper as a medium has an impact on the electromagnetic wave between a reader and an RFID tag, and thereby on the working of the entire RFID system. In a typical paper roll, the thickness of paper layers can be for example in the order of 1.5 meters. In the system, the paper twice attenuates an electromagnetic wave propagating there through, first as the radio wave travels from reader to tag, and then as the radio wave scatters back to the reader, whereby the radio wave is forced to make a total passage of as much as more than 3 meters through the paper stock. The situation will be even more problematic if the tag is provided on an internal surface of the core, meaning that the radio wave must twice propagate not only through the paper stock but also through the wall thickness of the core.

It should also be noted that for example the passive UHF-band RFID tag chip does not possess its own energy source at all, whereby the microchip must obtain all of its necessary energy by way of a tag antenna from the electromagnetic wave transmitted by the reader. Therefore, the tag antenna must have a large radar area for collecting energy onto the microchip and for scattering tag data back to the reader. The layers of paper and board have additionally an impact on the length of a wave traveling there through. A change in the wavelength must be considered in the process of dimensioning a tag antenna, since for example the size of antennas used in UHF-band RFID systems is directly proportional thereto. What must also be considered are various paper grades and various effects thereof on the working of a tag antenna for always maintaining the tag as highly functional as possible.

SUMMARY

It is one objective of the invention to eliminate or at least mitigate the drawbacks relating to prior art. According to one embodiment, the invention proposes a solution for placing a radio-readable tag, such that the tag would be well protected over the entire life cycle of a roll, it would be readily and conveniently mountable on a roll, and specifically in such a manner that would enable minimizing, even completely eliminating the effect of paper or a core present in the roll, among others, on the attenuation, wavelength or other characteristics of a radio wave.

According to a first embodiment of the invention, the paper roll core comprises a radio-readable tag, such as for example a passive RFID tag operating in the UHF band, which comprises a flexible segment, such as for example an antenna. In the invention, the core has its end face provided with a recess, which includes a bottom and a wall and in which said tag is fitted in an at least partially coiled condition, for example a wire type antenna can be coiled along the recess. According to one embodiment, the spring back force evolved as a result of coiling said flexible segment retains the tag essentially stationary, bracing said flexible segment against a wall and/or a bottom included in the recess. Alternatively or additionally, the tag can also be attached in other ways, such as for example by adhesive. The embodiment provides a distinct advantage over the prior art solutions with a tag located between the core and the paper stock, because, when placed in a recess made in the end face, the tag is first of all protected from wearing and impacts, but it is additionally readily readable from the end face of a roll, nor does the paper present on the roll hamper the propagation of a radio wave between the tag and the reader.

The antenna included in a tag can be for example a wire element, which is coiled into a recess in the roll and wherein the antenna attaches to a side of the tag. The tag can also be for example a planar tag label, whereby the antenna lies most preferably on an outer periphery of the single-plane tag. According to one embodiment of the invention, in a middle section of the tag, in an area defined by the peripherally placed antenna, is made an elongated cut about which the tag is folded into two halves, such that the first half is folded from the plane in a first direction and the second half is folded in a second direction substantially opposite to the first one. As a result, the antenna present in a perimeter area produces in a side view a pattern in the shape of an arc, an ellipse, a circle, or at least a partial circle. Folding the antenna as described above enables maximizing the antenna-covered area when viewed from the opening of a hole and from the direction of a reader, thus making the antenna more effective. In addition, such a construction is particularly convenient and quick and hence cost-efficient to implement.

According to one embodiment of the invention, the recess is a hole provided on an end face of the core, for example a hole drilled or milled co-directionally with the longitudinal axis of the core. In the example, the hole has a diameter which is smaller than the core's wall thickness, yet sufficiently large to enable fitting a radio-readable tag in the hole in a coiled configuration. In the embodiment, the tag's antenna makes up a pattern most preferably in the shape of an arc, an ellipse, a circle, or at least a partial circle about an axis inside the recess, such as the center axis. The advantage here is that the hole is easy and quick to make and, in addition, the wall of the core (which is simultaneously the wall of the hole) provides a physical protection for the tag. Moreover, the tag is readily and reliably readable from the end face of a paper roll at any point of the supply chain.

According to one preferred embodiment of the invention, the recess is a groove made on an end face of the core either by drilling, milling or by sawing or by some other prior known technique. Most preferably, the groove is a groove equal in length to the entire core wall periphery. In the example, the groove has a diameter which is smaller than that of the core's outer periphery, but larger than that of the core's inner periphery, and its center axis is substantially common with the core's longitudinal axis. A radio-readable tag is fitted in the groove made on an end face of the core, such that its antenna is located in said groove, extending most preferably over the entire length of the groove. In the embodiment, the tag's antenna, when viewed from the core's end face, makes up a pattern in the shape of an arc, an ellipse, a circle, or at least a partial circle about the center axis of the recess or groove, which in this case essentially coincides with the center axis of the core. The advantage here is that the groove is easy and quick to make for example with a saw type tool. In addition, the tag-protecting wall of the core is left with a reasonably large thickness, whereby the wall remains structurally robust and provides a highly effective physical protection for the tag. The antenna-covered surface area, when viewed from the core's end face and from the direction of a reader, is very large (depending on the diameter of a core, the antenna's length along a peripherally arranged groove can be even in excess of a meter). This way, the antenna will become highly effective and, moreover, the tag is readily and reliably readable from the end face of a paper roll at any point of the supply chain. In addition, the antenna in a coiled configuration retains itself very well in the groove, for example by virtue of a spring back force and/or by gluing.

The invention provides distinct benefits over the prior art, as presented above in connection with various embodiments. In particular, embodiments of the invention enable a tag, and an antenna included therein, to be protected physically, yet in such a way that readability of the tag is not affected by the amount of paper to be present on the roll or by the grade of paper or by the core. Further, according to a preferred embodiment, the antenna-covered surface area can be made very large by placing the antenna in a groove made over the entire peripheral distance of the core.

DESCRIPTION OF THE FIGURES

Preferred embodiments of the invention will be described in the next segment slightly more precisely with reference to the accompanying figures, in which FIGS. 4A-C show one exemplary method for the fabrication of a core with a tag according to one preferred embodiment of the invention, FIG. 5Aa shows one exemplary RFID tag and a method for the fabrication of a tag for a core of the invention according to one preferred embodiment of the invention, FIG. 5Ab shows another exemplary RFID tag according to one preferred embodiment of the invention, and FIGS. 5B-D show one exemplary method for the fabrication of a core with a tag according to one preferred embodiment of the invention.

DETAILED DESCRIPTION OF THE FIGURES

Figure 1:
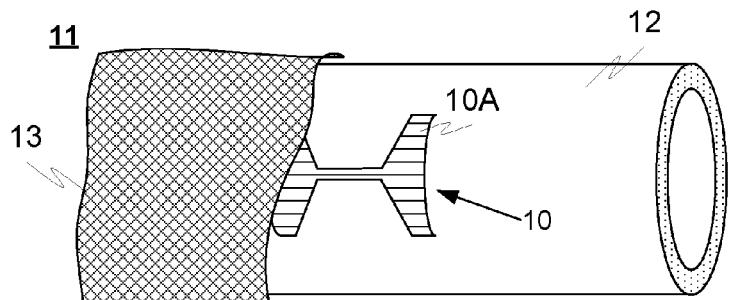
FIG. 1 shows one paper roll of the prior art provided with a tag.

FIG. 1 shows one prior art paper roll 11 provided with an RFID tag 10, wherein the tag, and particularly its antenna 10A, is located between a paper roll core 12 and paper 13 wound in layers around the core. The prior art arrangement has been discussed in more detail in the prior art section of this document.

Figure 2A:
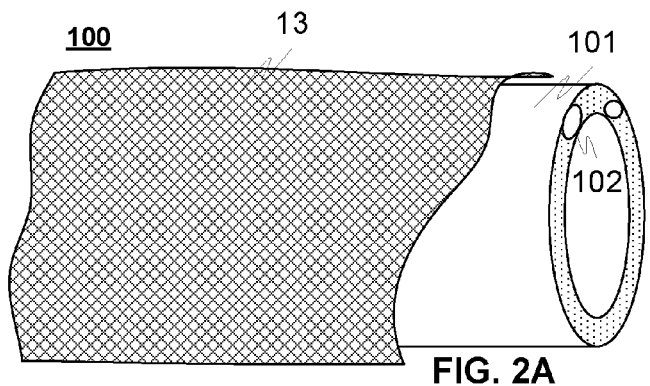
FIG. 2A shows one exemplary paper roll core according to one preferred embodiment of the invention.
Figure 2B:
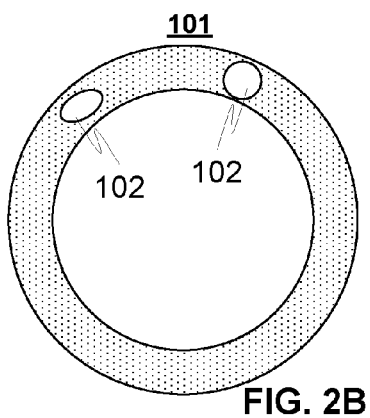
FIG. 2B shows the end face of one exemplary core according to one preferred embodiment of the invention, FIG. 3Aa shows one exemplary RFID tag according to one preferred embodiment of the invention, FIG. 3Ab shows another exemplary RFID tag according to one preferred embodiment of the invention.

FIGS. 2A and 2B show one exemplary core 101 for a paper roll 100 according to one preferred embodiment of the invention, wherein the core has on its end face drilled or otherwise made a recess 102 for a flexible tag.

Figure 3A:
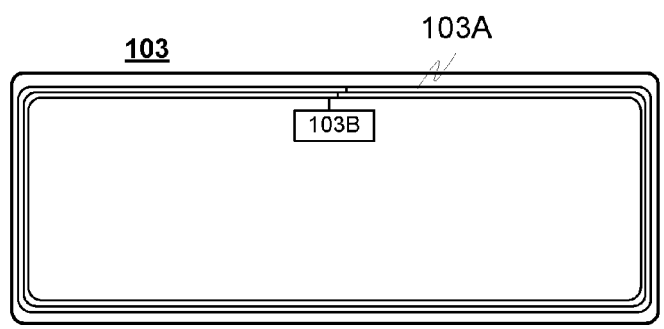
FIGS. 3B-D show one exemplary method for the fabrication of a core with a tag according to one preferred embodiment of the invention.
Figure 3A:
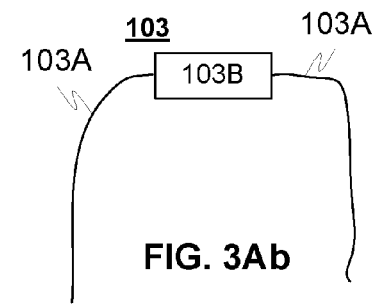
Figure 3B:
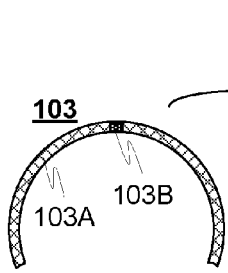
Figure 3C:
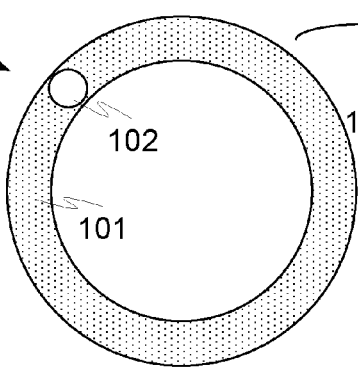
Figure 3D:
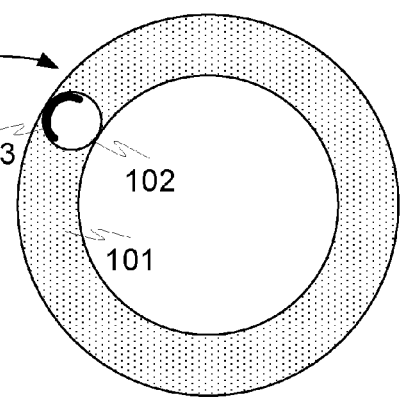

FIG. 3Aa shows one exemplary flexible RFID tag 103, which may include an antenna 103A set for example along an outer edge of the tag and a microchip 103B. FIG. 3Ab shows in turn another exemplary tag 103, wherein wire type antenna elements 103A are connected to a microchip 103B. FIG. 3B shows a coiled tag 103 in a side view. According to one embodiment of the invention, the tag can be coiled into what in a side view is for example the shape of a particle circle and fitted in a recess 102 made in the end face of a core depicted in FIG. 3C. According to one embodiment, the tag then remains stationary being retained by a spring back force evolved as a result of coiling the tag and bears against a wall and/or a bottom of the recess 102, as depicted in FIG. 3D. Alternatively or additionally, the tag can also be glued to the groove.

FIG. 4A shows one exemplary core 201 and FIG. 4C an end face of the core 201 according to one preferred embodiment of the invention, wherein the core 201 has its end face provided with a groove 202 (a recess), for example with a saw illustrated in FIG. 4B or with another suchlike tool. The groove has its center axis 205 substantially coinciding with a longitudinal axis 206 of the core 201. The groove 202 can be fitted with a flexible tag 203, for example as shown in FIGS. 5A-D.

FIG. 5Aa shows one exemplary flexible RFID tag 203, in which an antenna 203A is set preferably along an outer periphery of the tag, and which is provided with a microchip 203B. According to one preferred embodiment of the invention, in a middle section of the tag 203, in an area confined inside the peripherally placed antenna, is made an elongated cut 204 about which the tag 203 is folded into two halves 204A, 204B, such that the first half 204A is folded in a first direction and the second half 204B is folded in a second direction substantially opposite to the first one. As a result, the antenna present in a perimeter area makes up a pattern in the shape of an arc, an ellipse, a circle, or at least a partial circle as presented in FIG. 5B, wherein the first half 204A is present in a top section and the second half 204B in a bottom section of the antenna configured as a circle. Then the tag, which has been folded to match the diameter of a groove 202 in size and shape, is placed in the groove 202 of FIG. 5C made in the end face of a core 201, thus resulting in the core 201 with the tag 203. An end face of such a core 201 is illustrated in FIG. 5D. It should be noted that, as a result of folding or otherwise configuring the tag 203 of FIG. 5Aa in the above-described manner, a protrusion 204C may develop at a folding point of the sections deflected in different directions. Said protrusion can be for example double-folded, thus making the protrusion 204C flatter.

In addition, FIG. 5Ab shows another exemplary RFID tag 203, wherein wire type antenna elements 203A are connected to a microchip 203B, in which case the wire type antenna elements 203A are capable of being fitted in a groove 202 made in the end face of a core 201 as shown for example in FIG. 5C for providing the core 201 with the tag 203 as shown in FIG. 5D.

Described above are just a few embodiments for a solution of the invention. The principle of the invention can naturally be varied within the scope of protection defined by the claims, regarding for example details of implementation, as well as applications. In particular, it should be noted that, although the tag in this document has been presented most preferably as an RFID tag, such as a passive RFID tag operating in the UHF band, the invention is nevertheless not limited to this but the tag fitted in a recess can be any tag at all, including a semi-active or active RFID tag. It should further be noted that, although the document proposes a paper roll core, preferably a cardboard core, the core can nevertheless be also a core used in connection with some other type of roll and also consist of a material other than cardboard. Neither is the invention limited to an intended use of the tag, yet it should be mentioned that in the tag's microchip can be stored for example an individual ID number or some other roll- or core-specifying label that can be used in bar code identification. Information from the roll handling steps can then be stored for example in a data system, from which the handling information is then obtained on the basis of ID data possessed by the tag.

The invention claimed is:

1. A device, comprising:
    a core having a longitudinal axis, and an end face provided with a recess having a bottom and a wall; and
    a tag located in the recess, the tag being at least partially coiled within the recess,
    wherein said tag is a radio-readable tag, and
    wherein said recess is a groove provided in an end face of the core, the groove i) extending over an entire peripheral distance of the core between an entirety of inner and outer peripheries of the core, ii) having a diameter smaller than a diameter of the outer periphery of the core and larger than a diameter of the inner periphery of the core, and iii) having a center axis substantially common with the longitudinal axis of the core.

2. The device as set forth in claim 1, wherein the tag is retained substantially stationary within the recess by a spring back force evolved as a result of coiling said flexible element, the spring back force thus bracing said flexible element against the wall of the recess.

3. The device as set forth in claim 1, wherein the tag includes an antenna arranged along the tag's outer periphery, and wherein the tag's middle section is provided with an elongated cut about which cut the tag is folded into two halves, such that a first half of the two halves is folded in a first direction and a second half of the two halves is folded in a second direction which is substantially opposite to the first direction.

4. The device as set forth in claim 1, wherein the tag comprises an antenna with a pattern in the shape of an arc, an ellipse, a circle, or at least a partial circle about the center axis of the recess.

5. The device as set forth in claim 1, wherein said tag is an RFID tag.

6. The device of claim 1, wherein,
    the core is a paper roll core, and
    the tag comprises a flexible antenna.

7. The device of claim 6, wherein,
    said antenna extends along the entire length of the groove, the tag being readable from the end face of the core.

8. The device as set forth in claim 1, wherein the tag is retained substantially stationary within the recess by glue holding the tag to the wall of the recess.

9. A method for the fabrication of a device comprising a core with a tag, wherein said tag is comprised of a flexible element that includes an antenna, and wherein the method comprises:
    providing an end face of the core with a recess, which recess comprises a bottom and a wall and in which said tag is fitted in an at least partially coiled configuration wherein said recess is
    providing an end face of the core with a groove extending of all of an entire peripheral distance of the core, and which groove has a diameter smaller than that of the core's outer periphery but larger than that of the core's inner periphery, and a center axis of which groove is substantially common with a longitudinal axis of the core.

10. The method as set forth in claim 9, wherein the tag is retained substantially stationary by a spring back force evolved as a result of coiling said flexible element, thus bracing said flexible element against the wall of the recess.

11. The method as set forth in claim 9, wherein the tag comprises the antenna on its outer periphery, and has middle section provided with an elongated cut about which the tag is folded, such that a first half of the two halves is folded in a first direction and a second half of the two halves is folded in a direction which is opposite to the first direction.

12. The method as set forth in claim 9, wherein the antenna has a pattern in the shape of an arc, an ellipse, a circle, or at least a partial circle about a center axis of the recess as the tag is being fitted in said recess.

13. The method of claim 9, wherein
    said antenna extends along the groove, the tag being readable from the end face of the core.

14. The method as set forth in claim 9, comprising the further step of retaining the tag stationary within the recess by gluing the tag to the wall of the recess.

* * * * *